United States Patent
Xu et al.

(10) Patent No.: US 12,060,476 B2
(45) Date of Patent: *Aug. 13, 2024

(54) RUBBER COMPOSITION, PROCESSING METHOD THEREOF, RUBBER HOSE USING THE SAME

(71) Applicant: HANGZHOU XINGLU TECHNOLOGIES CO., LTD, Zhejinag (CN)

(72) Inventors: Tao Xu, Hangzhou (CN); Zhi Sheng Fu, Hangzhou (CN); An Yang Wu, Hangzhou (CN)

(73) Assignees: HANGZHOU XINGLU TECHNOLOGY CO., LTD., Zhejiang (CN); SHAOXING PINGHE NEW MATERIAL TECHNOLOGY CO., LTD., Zhejiang (CN)

( * ) Notice: Subject to any disclaimer, the term of this patent is extended or adjusted under 35 U.S.C. 154(b) by 554 days.

This patent is subject to a terminal disclaimer.

(21) Appl. No.: 16/477,518

(22) PCT Filed: Jan. 12, 2018

(86) PCT No.: PCT/CN2018/072374
§ 371 (c)(1),
(2) Date: Jul. 11, 2019

(87) PCT Pub. No.: WO2018/130199
PCT Pub. Date: Jul. 19, 2018

(65) Prior Publication Data
US 2020/0123353 A1 Apr. 23, 2020

(30) Foreign Application Priority Data

Jan. 13, 2017 (CN) .................... 201710024697.X
Jan. 10, 2018 (CN) .................... 201810020852.5

(51) Int. Cl.
| | |
|---|---|
| *C08L 23/06* | (2006.01) |
| *B32B 1/08* | (2006.01) |
| *B32B 27/08* | (2006.01) |
| *B32B 27/32* | (2006.01) |
| *C08K 3/011* | (2018.01) |
| *C08K 3/013* | (2018.01) |
| *C08K 5/00* | (2006.01) |
| *C08L 23/08* | (2006.01) |

(Continued)

(52) U.S. Cl.
CPC ............... *C08L 23/06* (2013.01); *B32B 1/08* (2013.01); *B32B 27/08* (2013.01); *B32B 27/32* (2013.01); *C08K 3/011* (2018.01); *C08K 3/013* (2018.01); *C08K 5/0016* (2013.01); *C08K 5/0025* (2013.01); *C08K 5/005* (2013.01); *C08L 23/0815* (2013.01); *C08L 23/14* (2013.01); *C08L 23/16* (2013.01); *B32B 2250/02* (2013.01); *B32B 2597/00* (2013.01); *B32B 2605/08* (2013.01); *C08L 2203/18* (2013.01); *C08L 2205/02* (2013.01); *C08L 2205/03* (2013.01)

(58) Field of Classification Search
CPC .......... C08L 23/08; C08L 23/16; C08L 23/06; C08L 23/04; C08L 91/00; C08L 71/02; C08K 5/0016; C08K 3/22; C08K 3/346; C08K 5/0025; C08K 3/013; C08K 5/34924; C08K 5/14; C08K 3/04; C08K 3/011; C08K 5/005; C08K 3/06; C08K 3/26; C08K 5/09; C08K 2003/265; C08K 2003/2217; C08K 2003/2206; C08K 2003/2296; C08K 2003/222; C08K 2201/014

See application file for complete search history.

(56) References Cited

U.S. PATENT DOCUMENTS

| | | | |
|---|---|---|---|
| 6,103,658 | A | 8/2000 | Mackenzie et al. |
| 6,660,677 | B1 | 12/2003 | Mackenzie et al. |

(Continued)

FOREIGN PATENT DOCUMENTS

| | | |
|---|---|---|
| CN | 101531725 A | 9/2009 |
| CN | 101812145 A | 8/2010 |

(Continued)

OTHER PUBLICATIONS

SIPO, International Search Report issued in IA No. PCT/CN2018/072374, mailed Apr. 13, 2018.

*Primary Examiner* — Marc S Zimmer
*Assistant Examiner* — Jeffrey S Lenihan
(74) *Attorney, Agent, or Firm* — LKGlobal | Lorenz & Kopf, LLP

(57) ABSTRACT

The present invention discloses a rubber composition, a processing method for obtaining the rubber composition, a rubber hose using the rubber composition and a production method thereof. The rubber composition comprises, in parts by weight, 100 parts of a rubber matrix, 1.5-8 parts of a crosslinking agent, 50-200 parts of a reinforcing filler, 10-100 parts of a plasticizer, and also 0.2-8 parts of an auxiliary crosslinking agent, 2-15 parts of a metal oxide, 1-3 parts of a stabilizer and 1-5 parts of polyethylene glycol, wherein, with respect to 100 parts by weight of total amount of said rubber matrix, said rubber matrix comprises a branched polyethylene with a content represented as A, in which $0<A\leq 100$ parts, and both an EPM rubber and an EPDM rubber with a total content represented as B, in which $0\leq B<100$ parts. The beneficial effect is that a rubber hose with good mechanical strength can be prepared from the rubber composition provided in the present invention.

16 Claims, No Drawings

(51) Int. Cl.
*C08L 23/14* (2006.01)
*C08L 23/16* (2006.01)

(56) References Cited

U.S. PATENT DOCUMENTS

| | | | |
|---|---|---|---|
| 11,242,450 B2* | 2/2022 | Xu | C08K 3/013 |
| 11,479,661 B2* | 10/2022 | Xu | E01D 19/041 |
| 11,499,041 B2* | 11/2022 | Xu | C08K 5/34924 |
| 11,634,566 B2* | 4/2023 | Xu | B60C 1/0016 |
| | | | 525/515 |
| 2003/0124284 A1* | 7/2003 | Ikemoto | B32B 15/08 |
| | | | 428/36.8 |

FOREIGN PATENT DOCUMENTS

| | | | |
|---|---|---|---|
| CN | 102135214 A | | 7/2011 |
| CN | 102827312 A | | 12/2012 |
| CN | 103980596 A | * | 8/2014 |
| CN | 104877225 A | | 9/2015 |
| CN | 104910487 A | | 9/2015 |
| CN | 104926962 A | | 9/2015 |
| CN | 105017658 A | * | 11/2015 |
| CN | 106117823 A | | 11/2016 |

\* cited by examiner

RUBBER COMPOSITION, PROCESSING METHOD THEREOF, RUBBER HOSE USING THE SAME

CROSS REFERENCE TO RELATED APPLICATIONS

The present application is the U.S. national phase of and claims priority to International Patent Application No. PCT/CN2018/072374 filed Jan. 12, 2018, which claims the benefit of priority from China National Application No. 201710024697.X, filed on Jan. 13, 2017 and China National Application No. 201810020852.5, filed on Jan. 10, 2018, the entire content of each of which is incorporated herein by reference into the present disclosure as if fully set forth herein.

TECHNICAL FIELD

The present invention relates to the technical field of rubbers, in particular to a rubber composition, and a processing method for obtaining the rubber composition, and also to a rubber hose using the rubber composition and a production method thereof.

BACKGROUND

Ethylene-propylene rubbers have a wide range of applications in the field of rubber hoses. With the increasingly higher requirements raised for the heat resistance and compression set resistance in some rubber hose application areas (such as automobile radiator rubber hose, and brake rubber hose), the vulcanization process for rubber hoses gradually transitions from the previous sulfur vulcanization to peroxide vulcanization to obtain better heat resistance and compression set resistance. However, the tear strength of the rubber after peroxide vulcanization is lower than that of the rubber obtained by sulfur vulcanization, which results in more unqualified products in the production of rubber hoses, thus reducing the production efficiency and increasing the production cost.

Ethylene-propylene rubbers are a kind of synthetic rubbers with a saturated molecular backbone, and include ethylene propylene monomer (EPM) and ethylene-propylene-diene monomer (EPDM), both of which have good aging resistance. EPDM is commonly used in the ethylene-propylene rubber products. However, since EPM contains a third monomer with a molecular chain having a double bond and EPM has a completely saturated molecular chain, EPM has more excellent aging resistance. Therefore, in a situation where a higher requirement is raised for the aging resistance, it is a common technical solution to use EPM in combination to improve the aging resistance of EPM. However, the mechanical strength of EPM is low, which affects the overall physical and mechanical properties.

EPM is a copolymer of ethylene and propylene, which is a copolymer of ethylene and an α-olefin. The copolymer of ethylene and an α-olefin is a polymer containing only carbon and hydrogen elements and having a saturated molecular chain. The common types of carbon atoms found in such polymers generally include primary, secondary and tertiary carbons, in which the tertiary carbon is most susceptible to hydrogen abstraction to form a free radical. Accordingly, the proportion of tertiary carbon atoms in all carbon atoms is generally considered to be a major factor affecting the aging resistance of ethylene/α-olefin copolymers. The lower the proportion is, the better the aging resistance will be. The proportion can be expressed by the branching degree. For example, an EPM having a propylene content of 60% by weight can be calculated to contain 200 propylene units, that is, 200 tertiary carbon atoms or 200 methyl branches, per 1000 carbon atoms, so the branching degree is 200 branches/1000 carbon atoms. EPM usually has an ethylene content of 40-65% or 40-60% by weight, so the branching degree is generally in the range of 117-200 branches/1000 carbon atoms or 133-200 branches/1000 carbon atoms. This branching degree is considered to be higher than that of other common ethylene/α-olefin copolymers.

In the prior art, the α-olefin in the common ethylene/α-olefin copolymers may include, in addition to propylene, an α-olefin having a carbon number of not less than 4, which may be selected from a $C_4$-$C_{20}$ α-olefin, and is generally selected from 1-butene, 1-hexene and 1-octene. If the branching degree of an ethylene/α-olefin copolymer is too low, the melting point and crystallinity are too high, so it is not suitable for use as a rubber component. If the branching degree is too high, the content of α-olefin is high, which leads to a higher process difficulty and raw material cost, and a lower operability and economical efficiency. In the prior art, a polyolefin obtained by copolymerizing ethylene with 1-butene or ethylene with 1-octene can be referred to as a polyolefin plastomer or a polyolefin elastomer according to the magnitudes of crystallinity and melting point. Due to their proper crystallinity and melting point, some polyolefin elastomer brands can be well used in combination with an ethylene-propylene rubber and have a low branching degree, so they are considered to be an ideal material for improving the aging resistance of ethylene-propylene rubbers, and can be used in place of ethylene-propylene rubbers to some extent. Since an ethylene/1-octene copolymer has more flexible molecular chain, higher rubber elasticity, and better mechanical performance than an ethylene/1-butene copolymer, the polyolefin elastomer commonly used in rubber products is generally a copolymer of ethylene and 1-octene at present, in which the octene content in percentages by weight is generally not higher than 45%, and more generally not higher than 40%, and the corresponding branching degree is generally not higher than 56 branches/1000 carbon atoms, and more generally not higher than 50 branches/1000 carbon atoms, which is much lower than the branching degree of EPM. Therefore, the ethylene/1-octene copolymer has excellent aging resistance and good physical and mechanical properties.

Rubbers are usually used after cross-linking. Among common cross-linking methods for ethylene-propylene rubbers, peroxide cross-linking or irradiation cross-linking can be suitably used for a copolymer of ethylene and an α-olefin, both of which mainly comprise: forming a tertiary carbon radical by hydrogen abstraction from a tertiary carbon and then creating a carbon-carbon crosslink by free radical bonding. However, an ethylene/1-octene copolymer (hereinafter referred to as POE) has a low number of tertiary carbon atoms and has a longer branch attached to the tertiary carbon atom, so the steric hindrance is large, and the free radical reaction is difficult to occur, resulting in difficulty in crosslinking, thus affecting the processing efficiency and product performance. For example, the compression set resistance is unsatisfactory.

Therefore, there is currently a need for a better technical solution, which can improve the aging resistance of ethylene-propylene rubbers while the rubber composition has good physical and mechanical properties and cross-linking performance, and is expected to behave well with respect to particular functional performance of rubber products such as rubber hoses (for example, compression set resistance and so on).

SUMMARY

In view of the problems existing in the prior art, the present invention provides a rubber composition and its use in rubber hoses and the production method thereof. Branched polyethylene with a branching degree which is not less than 50 branches/1000 carbon atoms is used to replace a part or all of the ethylene-propylene rubber, and peroxide vulcanization is adopted. The new rubber composition can be used as the rubber material in an inner rubber layer and(or) in an outer rubber layer of a rubber hose, or as the rubber material of a whole rubber hose.

The rubber matrix of the rubber composition of the present invention may be composed entirely of an branched polyethylene, or may be composed of an branched polyethylene and an ethylene propylene monomer, or may be composed of a branched polyethylene and an ethylene propylene diene monomer, or may be composed of a branched polyethylene, an EPM and an EPDM. The combination of a branched polyethylene and an EPM can improve the mechanical properties and processing performance of EPM. The combination of an branched polyethylene and an EPDM can improve the heat and aging resistances and mechanical properties of EPM. A small amount of a diene existing in an EPDM can function as an intrinsic auxiliary crosslinking agent in the peroxide vulcanization.

In order to achieve the above object, the technical solution adopted in the present invention relates to a rubber composition comprising a rubber matrix and certain essential components. The rubber matrix comprises, in parts by weight, a branched polyethylene with a content represented as A, 0<A≤100 parts, and an EPM and an EPDM, with a total content represented as B, 0≤B<100 parts; wherein, with respect to 100 parts by weight of the total amount of said rubber matrix, said certain essential components comprise 1.5 to 8 parts of a crosslinking agent, 50 to 200 parts of a reinforcing filler, and 10 to 100 parts of a plasticizer, wherein said branched polyethylene comprises an ethylene homopolymer having a branching degree which is not less than 50 branches/1000 carbon atoms, a weight average molecular weight which is not less than 50,000, and a Mooney viscosity ML (1+4) at 125° C. which is not less than 2.

In the prior art, "branched polyethylene" refers to, in addition to an ethylene homopolymer with branched chains, a saturated vinyl copolymer with branched chains, for example, an ethylene-α-olefin copolymer, which may be POE. Although POE performs well in physical and mechanical properties and aging resistance, the cross-linking performance is poor. Therefore, although the branched polyethylene of the present invention can include both a branched ethylene homopolymer and POE, it is preferred that the branched polyethylene comprises a high proportion of or exclusively a branched ethylene homopolymer. In a preferred embodiment of the present invention, the branched polyethylene comprises exclusively a branched ethylene homopolymer.

In the further elaboration of the technical solution of the present invention, the branched polyethylene used is a branched ethylene homopolymer unless otherwise particularly specified.

The branched polyethylene used in the present invention is a kind of ethylene homopolymer having a branching degree which is not less than 50 branches/1000 carbon atoms, which may also be referred to as Branched Polyethylene or Branched PE. Currently, the synthesis method comprises mainly homopolymerizing ethylene following a "chain walking mechanism" in the presence of a late transition metal catalyst, where the late transition metal catalyst is preferably an (α-diimine)nickel/palladium catalyst. The nature of the chain walking mechanism refers to the fact that a β-hydrogen elimination reaction and a re-insertion reaction tend to occur in the polymerization of an olefin in the presence of a late transition metal catalyst, for example, an (α-diimine)nickel/palladium catalyst, thereby causing branching. The branches pendant to the backbone of such branched polyethylene may have different numbers of carbon atoms, and specifically 1 to 6 or more carbon atoms.

The production cost of an (α-diimine) nickel catalyst is significantly lower than that of an (α-diimine) palladium catalyst, and the (α-diimine) nickel catalyst has a high rate and high activity in catalyzing the polymerization of ethylene, and is thus more suitable for industrial application. Therefore, in the present invention, an (α-diimine) nickel catalyst is preferably used in the production of branched polyethylene through catalytic polymerization of ethylene.

The branching degree of the branched polyethylene used in the present invention is preferably 50 to 130 branches/1000 carbon atoms, further preferably 60 to 130 branches/1000 carbon atoms, and further preferably 60 to 116 branches/1000 carbon atoms. The branching degree is between that of POE and EPM, constituting a new technical solution that is different from the prior art. Therefore, the rubber matrix of present invention has both excellent aging resistance and good cross-linking performance.

The cross-linking performance include factors such as crosslinking density and crosslinking rate, and are the specific manifestations of the cross-linking ability of the rubber matrix in the processing process.

The branched polyethylene used in the present invention preferably has a methyl branch content of 40% or more or 50% or more, and has a similarity in structure with EPM. In terms of the crosslinking ability, the branching degree (the content of tertiary carbon atom) and the steric hindrance around the tertiary carbon atom are the two main factors affecting the crosslinking ability of a saturated polyolefin. Compared with EPM, the branched polyethylene used in the present invention has a low branching degree, and since the branched polyethylene has branches with the carbon number of not less than 2, the steric hindrance around the tertiary carbon atom of the branched polyethylene used in the present invention is theoretically greater than that of EPM. Taking the two factors into account, it can be inferred that the crosslinking ability of the branched polyethylene used in the present invention is weaker than that of EPM and further weaker than that of EPDM. However, the actual crosslinking ability of the partially branched polyethylene used in the present invention is close to, and can even be equal to or better than that of EPDM. This means that the rubber composition of the present invention can achieve a good aging resistance while the crosslinking ability is not weakened, and can even have excellent crosslinking performance to achieve unexpected beneficial effects.

This may be explained by the fact that there may be an appropriate number of secondary branch structures on the branched polyethylene used in the preferred technical solution of the present invention. The so-called secondary branch structure refers to a branch structure that further exists on a branch, which is formed in the chain walking process. This structure is also called "branch-on-branch".

Because the steric hindrance around the tertiary carbon atoms of the secondary branch is low, a cross-linking reaction is more likely to occur. Having a secondary branch structure is a significant distinction of the branched polyethylene used in the preferred embodiment of the present invention from EPM or the conventional ethylene-α-olefin copolymer in the prior art.

It is a new technical solution to improve the crosslinking ability of a saturated polyolefin elastomer by using the secondary branch structure with lower steric hindrance. According to the technical solution of the present invention, it is also considered to be within the technical protection of the present invention to include a vinyl copolymer having a secondary branch structure or other saturated hydrocarbon polymers in the rubber matrix. The vinyl copolymer refers to a copolymer of ethylene with a branched α-olefin and has a secondary branch structure.

The branched α-olefin may be selected from the group consisting of isobutene, 3-methyl-1-butene, 4-methyl-1-pentene, 3-methyl-1-pentene, 2-methyl-1-heptene, 3-methyl-1-heptene, 4-methyl-1-heptene, 5-methyl-1-heptene, and 6-methyl-1-heptene, and the comonomer may also include a common linear α-olefin.

It is generally believed in the prior art that the branched polyethylene produced in the presence of an (α-diimine) nickel catalyst is difficult to have a secondary branch structure that is at least difficult to fully identify, and the technical solution of the present invention also provides a new idea for analyzing the structure of the branched polyethylene.

Compared with the ethylene-propylene rubber, if branched polyethylene has an appropriate number of secondary branch structures, the crosslinking point of the branched polyethylene can be generated on the tertiary carbon of the backbone or on the branched tertiary carbon of the secondary structure during the peroxide crosslinking. Therefore, the rubber network formed by the peroxide crosslinking of the branched polyethylene has richer C—C bonding segments between the main chains than the ethylene-propylene rubber, which can effectively avoid the concentration of stress, and contribute to better mechanical properties, including tear strength. Therefore, the technical solution of the present invention can provide a rubber material and a rubber hose which have both good heat resistance and tear strength.

In a further technical solution, based on 100 parts by weight of the rubber matrix, the content of the branched polyethylene is represented as A, in which 0<A≤100 parts, and the total content of both EPM and EPM is represented as B, in which 0≤B<100 parts; wherein, the branched polyethylene is an ethylene homopolymer having a branching degree of 60 to 130 branches/1000 carbon atoms, a weight average molecular weight of 66,000 to 518,000, and a Mooney viscosity ML (1+4) at 125° C. of 6 to 102.

In a further preferred technical solution, the branched polyethylene has a branching degree of 70-116 branches/1000 carbon atoms, a weight average molecular weight of 201,000-436,000, and a Mooney viscosity ML (1+4) at 125° C. of 23-101.

In a further preferred technical solution, the branched polyethylene has a branching degree of 80-105 branches/1000 carbon atoms, a weight average molecular weight of 250,000-400,000, and a Mooney viscosity ML (1+4) at 125° C. of 40-95.

In a further preferred technical solution, the branched polyethylene has a branching degree of 80-105 branches/1000 carbon atoms, a weight average molecular weight of 268,000-356,000, and a Mooney viscosity ML (1+4) at 125° C. of 42-80.

In a further technical solution, a third monomer of EPM is preferably a diene monomer, particularly selected from the group consisting of 5-ethylidene-2-norbornene, 5-vinyl-2-norbornene, dicyclopentadiene, 1,4-hexadiene, 1,5-hexadiene, 1,4-pentadiene, 2-methyl-1,4-pentadiene, 3-methyl-1,4-hexadiene, 4-methyl-1,4-hexadiene, 1,9-decadiene, 5-methylene-2-norbornene, 5-pentylidene-2-norbornene, 1,5-cyclooctadiene, 1,4-cyclooctadiene, and the like. In particular, the ethylene-propylene rubber may contain two or more diene monomers, for example, 5-ethylidene-2-norbornene and 5-vinyl-2-norbornene. The functional group of the diene monomer can function as an intrinsic auxiliary crosslinking agent in the peroxide vulcanization to improve the crosslinking efficiency. This reduces the amount and residue of the crosslinking agent and the auxiliary crosslinking agent required and the cost when they are added. The content in percentages by weight of the diene monomer relative to the ethylene-propylene rubber is preferably from 1% to 14%, more preferably from 3% to 10%, and further preferably from 4% to 7%.

In a further technical solution, the crosslinking agent comprises at least one of a peroxide crosslinking agent and sulfur. The peroxide crosslinking agent comprises at least one of di-tert-butyl peroxide, dicumyl peroxide, tert-butyl cumyl peroxide, 1,1-di-tert-butylperoxide-3,3,5-trimethylcyclohexane, 2,5-dimethyl-2,5-di(tert-butylperoxy)hexane, 2,5-dimethyl-2,5-di(tert-butylperoxy)hexyne-3, bis(tert-butylperoxyisopropyl)benzene, 2,5-dimethyl-2,5-bis(benzoylperoxy)hexane, tert-butyl peroxybenzoate, and tert-butylperoxy-2-ethylhexyl carbonate, and further preferably, the amount of the crosslinking agent is 2 to 6 parts by weight.

In a further technical solution, the reinforcing filler comprises at least one of carbon black, calcium carbonate, calcined clay, magnesium silicate, aluminium silicate, magnesium carbonate, talc, and diatomite. Preferably, the rubber composition further comprises, based on 100 parts by weight of the rubber matrix, 40-150 parts by weight of carbon black, which is used as a rubber reinforcer to greatly improve the mechanical strength of the rubber material. The talc herein may be further preferably talc treated with a vinyl silane coupling agent.

In a further technical solution, the plasticizer comprises at least one of stearic acid, pine tar, motor oil, naphthenic oil, paraffin oil, coumarone, RX-80, paraffin, liquid polyisobutene, and dioctyl sebacate. Stearic acid can also act as an active agent in a sulfur vulcanization-based system, and reacts with some metal oxides to form soluble salts, thereby increasing the activation of a promoter by metal oxides. Proper use of a plasticizer can increase the elasticity of the rubber material and the plasticity suitable for process operation. In order to increase the adhesion, it is also preferred to use a tackifier such as pine tar, coumarone, RX-80, liquid polyisobutene and the like.

In a further technical solution, the rubber composition further comprises auxiliary components, which comprise, based on 100 parts by weight of the rubber matrix, 0.2 to 8 parts of an auxiliary crosslinking agent, 2 to 15 parts of a metal oxide, 1 to 3 parts of a stabilizer, 1 to 5 parts of polyethylene glycol, and 0 to 3 parts of a vulcanization accelerator.

In a further technical solution, the auxiliary crosslinking agent comprises at least one of triallyl cyanurate, triallyl isocyanurate, ethylene glycol dimethacrylate, ethyl dimethacrylate, triethylene glycol dimethacrylate, triallyl trimellitate, trimethylolpropane trimethacrylate, ethylene dimethacrylate, N,N'-m-phenylene bismaleimide, N,N'-bis(furfurylidene)acetone, 1,2-polybutadiene, a metal salt of an unsaturated carboxylic acid, and sulfur. The metal salt of an unsaturated carboxylic acid includes at least one of zinc acrylate, zinc methacrylate, magnesium methacrylate, calcium methacrylate, and aluminum methacrylate.

In a further technical solution, the metal oxide comprises at least one of zinc oxide, magnesia, and calcium oxide.

In a further technical solution, the stabilizer comprises at least one of 2,2,4-trimethyl-1,2-dihydroquinoline polymer (RD), 6-ethoxy-2,2,4-trimethyl-1,2-dihydroquinoline (AW), and 2-mercaptobenzimidazole (MB).

In a further technical solution, the polyethylene glycol comprises at least one of those polyethylene glycol having a molecular weight of 2000, 3400, and 4000.

In a further technical solution, the vulcanization accelerator comprises at least one of 2-mercaptobenzothiazole, dibenzothiazyl disulfide, tetramethyl thiuram monosulfide, tetramethyl thiuram disulfide, tetraethyl thiuram disulfide, zinc di-n-butyl dithiocarbamate, N-cyclohexyl-2-benzothiazole sulfenamide, N,N-dicyclohexyl-2-benzothiazole sulfenamide, bismaleimide, and ethylene thiourea.

In an embodiment of the present invention, in order to improve the adhesion of the rubber compound, the rubber composition may further comprise a tackifier. The pine tar, coumarone resin, RX-80, and liquid polyisobutene mentioned above for the plasticizer also have a tackifying effect. The liquid coumarone resin has a better tackifying effect than that of a solid coumarone resin. The tackifier can also be selected from the group consisting of C5 petroleum resin, C9 petroleum resin, hydrogenated rosin, terpene resin, alkyl phenolic resin, modified alkyl phenolic resin, alkylphenolacetylene resin, and other commonly used tackifiers. The tackifier is usually used in an amount of not more than 30 parts by weight, further preferably not more than 10 parts by weight, and further preferably not more than 5 parts by weight, based on 100 parts by weight of the rubber matrix.

The crosslinking agent, the auxiliary crosslinking agent and the vulcanization accelerator involved in the rubber composition provided in the present invention all belong to a crosslinking system.

The rubber composition of the present invention may be present in the form of an uncrosslinked rubber mix, and may be present in the form of a vulcanized rubber after a further crosslinking reaction, and the vulcanized rubber may also be simply referred to as a vulcanizate.

The present invention also provides a processing method for obtaining the rubber composition, which comprises the following steps:
(1) rubber mixing: setting the temperature and the rotor speed of an internal mixer, adding other components than a crosslinking system in a rubber composition sequentially to the internal mixer and mixing; then adding the crosslinking system, mixing, and discharging the rubber; and plasticating the obtained rubber mix on an open mill, unloading, and placing, wherein the crosslinking system includes a crosslinking agent, and also at least one of an auxiliary crosslinking agent and a vulcanization accelerator; and
(2) vulcanization: filling the rubber mix into a cavity of a mold, vulcanizing on a press vulcanizer by heating and pressing, and releasing from the mold to obtain a vulcanized rubber, where in order to improve the mechanical strength and compression set resistance of the vulcanized rubber, a two-stage vulcanization process can be further used for vulcanization.

The present invention also provides an all-rubber hose, where the rubber compound used comprise the above rubber composition.

A method for producing the all-rubber hose comprises the steps of:
(1) rubber mixing: adding other components than a crosslinking system in a rubber composition sequentially to an internal mixer according to the parts by weight and mixing; then adding the crosslinking system, mixing uniformly, and discharging to obtain a rubber mix; and plasticating the rubber mix on an open mill, unloading, and placing for vulcanization later, where the crosslinking system includes a crosslinking agent, and also at least one of an auxiliary crosslinking agent and a vulcanization accelerator; and
(2) extrusion molding: extruding a layer of rubber on a mandrel by using a cold feed extruder to obtain a hose blank, steam vulcanizing, cooling, removing from the mandrel, trimming, inspecting, and storing to obtain a rubber hose.

The present invention also provides an automobile radiator rubber hose, having an inner rubber layer and an outer rubber layer, at least one of which comprises the above rubber composition.

The present invention also provides a method for producing an automobile radiator rubber hose, comprising the steps of:
(1) rubber mixing: setting a proper temperature and rotor speed of an internal mixer, adding other components than a crosslinking system in a rubber composition sequentially to an internal mixer according to the parts by weight and mixing; then adding the crosslinking system, mixing uniformly, and discharging to obtain a rubber mix; and plasticating the rubber mix on an open mill, unloading, and placing for vulcanization later, where the crosslinking system includes a crosslinking agent, and also at least one of an auxiliary crosslinking agent and a vulcanization accelerator; and
(2) extrusion molding: extruding an inner rubber layer by using a cold feed extruder, then knitting a fiber reinforcing layer on the inner rubber layer, and then extruding an outer rubber layer to obtain a hose blank which is cut for vulcanization later; and
(3) vulcanization: inserting a mandrel into the hose blank, steam vulcanizing, cooling, removing from the mandrel, trimming, inspecting, and storing to obtain an automobile radiator rubber hose.

The present invention also provides an air-conditioning rubber hose, having an inner rubber layer and an outer rubber layer, at least one of which comprises the above rubber composition.

The present invention also provides a method for producing an air-conditioning rubber hose, comprising the steps of:
(1) rubber mixing: setting a proper temperature and rotor speed of an internal mixer, adding other components than a crosslinking system in a rubber composition sequentially to an internal mixer according to the parts by weight and mixing; then adding the crosslinking system, mixing uniformly, and discharging to obtain a rubber mix; and plasticating the rubber mix on an open mill, unloading, and placing for vulcanization later, where the crosslinking system includes a crosslinking agent, and also at least one of an auxiliary crosslinking agent and a vulcanization accelerator; and (2) extrusion molding: preparing a mandrel, extruding a nylon alloy lining on the mandrel, then extruding an inner rubber layer, knitting a fiber reinforcing layer, and then extruding an outer rubber layer; and (3) vulcanization: wrapping a tape and vulcanizing, unwrapping the tape, removing the mandrel, and cutting, to obtain an air-conditioning rubber hose.

In a further technical solution, the rubber compound used in the outer rubber layer of the radiator rubber hose or air-conditioning rubber hose may further contain a binder to enhance the bonding performance to the fiber reinforcing layer. The component of the binder may be a polyisocyanate salt present in an amount that is preferably from 1 to 3 parts by weight. The present invention also provides a rubber hose assembly, having an inner rubber layer and an outer rubber layer, at least one of which comprises the above rubber composition.

The present invention also provides a method for producing a rubber hose assembly, comprising the steps of:

(1) rubber mixing: processing the raw materials of an inner rubber layer and an outer rubber layer respectively into an inner-layer rubber mix and an outer-layer rubber mix by an open mill or an internal mixer, and removing the impurities by filtration after being inspected qualified;

(2) molding of hose blank: extruding the inner rubber layer by using a cold feed extruder, knitting an Aramid fiber layer on the outer surface of the inner rubber layer, and finally extruding the outer-layer rubber mix by an outer rubber layer extruder in such a way that the outer-layer rubber mix covers on the outer surface of the Aramid fiber layer, to form a hose blank;

(3) vulcanization: sleeving the hose blank on a mandrel of a hose mold, vulcanizing in a steam vulcanizer by pressurizing to 0.9 MPa with steam and heating to 175° C. for 25 min, to obtain a vulcanized rubber hose; and (4) fitting clamping hoops, cleaning and cutting the vulcanized rubber hose, and bonding a pre-open clamping hoop at both ends of each hose, to obtain a rubber hose assembly.

Compared with the prior art, the present invention has the beneficial effects that the rubber composition containing the branched polyethylene has higher tensile strength and tear resistance under the conditions that other components in the formulation are the same or similar. The rubber hose produced with this rubber composition as a raw material has a significantly reduced probability of tearing of the rubber hose during production and use. Meanwhile, the resistance to hot air aging at 150° C. is maintained at the same level as or slightly better than that of the rubber composition comprising an ethylene-propylene rubber alone, thus meeting the requirements for high temperature resistance of the automobile radiator rubber hose and air-conditioning rubber hose at present.

DETAILED DESCRIPTION

Hereinafter, the rubber composition and rubber hose according to the present invention are further described with reference to embodiments. The following embodiments are merely used to illustrate the technical solutions, and not intended to limit the present invention. The unit "part(s)" in the embodiments is part(s) by weight, unless otherwise particularly specified.

To more clearly illustrate the embodiments of the present invention, the materials involved in the present invention are defined below.

The crosslinking system includes a crosslinking agent, and also at least one of an auxiliary crosslinking agent and a vulcanization accelerator.

In the present invention, EPM used in the rubber matrix preferably has a Mooney viscosity ML (1+4) at 125° C. of 20-50 and an ethylene content of 45%-60%. EPM used preferably has a Mooney viscosity ML (1+4) at 125° C. of 20 to 100, and an ethylene content of 55% to 75%. The third monomer is 5-ethylidene-2-norbornene, 5-vinyl-2-norbornene or dicyclopentadiene, and the content of the third monomer is 1%-7%.

The branched polyethylene can be obtained by the catalytic homopolymerization of ethylene in the presence of an (α-diimine) nickel catalyst and a cocatalyst. The structure of the (α-diimine) nickel catalyst used, the synthesis method and the method for preparing branched polyethylene therewith are disclosed in the prior art, and can adopt the following literature, without limitation, CN102827312A, CN101812145A, CN101531725A, CN104926962A, U.S. Pat. Nos. 6,103,658, and 6,660,677.

The branched polyethylene used is characterized by having a branching degree of 60-130 branches/1000 carbon atoms, a weight average molecular weight of 66,000-518,000, and a Mooney viscosity ML (1+4) at 125° C. of 6-102. The branching degree is measured by $^1$H NMR, and the molar percentages of various branches are measured by $^{13}$C NMR.

The details are shown in a table below:

| Branched polyethylene No. | Branching degree | Methyl/% | Ethyl/% | Propyl/% | Butyl/% | Pentyl/% | Hexyl or higher/% | Weight average molecular weight/10,000 | Molecular weight distribution | Mooney viscosity ML (1 + 4) at 125° C. |
|---|---|---|---|---|---|---|---|---|---|---|
| PER-1 | 130 | 46.8 | 18.3 | 8.3 | 6.7 | 5.2 | 14.7 | 18.9 | 2.2 | 6 |
| PER-2 | 116 | 51.2 | 17.6 | 8.2 | 5.8 | 5.1 | 12.1 | 21.0 | 2.1 | 23 |
| PER-3 | 105 | 54.0 | 13.7 | 6.4 | 5.3 | 5.1 | 15.5 | 26.8 | 2.1 | 42 |
| PER-4 | 95 | 61.2 | 10.9 | 5.6 | 5.1 | 4.9 | 12.3 | 29.8 | 1.9 | 67 |
| PER-5 | 82 | 64.2 | 8.7 | 5.3 | 4.2 | 3.9 | 13.7 | 35.6 | 1.7 | 80 |
| PER-6 | 70 | 66.5 | 7.2 | 4.6 | 3.2 | 3.2 | 15.3 | 43.6 | 2.1 | 93 |
| PER-7 | 60 | 68.1 | 7.1 | 4.2 | 2.7 | 2.8 | 15.1 | 51.8 | 2.2 | 102 |
| PER-8 | 87 | 61.8 | 10.3 | 5.4 | 4.6 | 4.9 | 12.0 | 40.1 | 1.8 | 101 |
| PER-9 | 94 | 60.5 | 10.8 | 5.7 | 4.7 | 4.9 | 13.3 | 37.8 | 2.0 | 85 |
| PER-10 | 102 | 56.8 | 12.7 | 6.1 | 5.2 | 5.1 | 13.9 | 34.8 | 1.9 | 66 |

Rubber performance test methods involved in the specific embodiments and relevant experiments:

1. Hardness test: The test is carried out using a hardness tester at room temperature in accordance with the national standard GB/T531.1-2008.

2. Tensile strength and elongation at break performance test: The test is carried out with a type 2 dumbbell specimen using an electronic tensile tester at a tensile speed of 500 mm/min and a test temperature of 23±2° C. in accordance with the national standard GB/T528-2009.
3. Tear performance test: The test is carried out with a right-angled specimen using an electronic tensile tester at a tensile speed of 500 mm/min and a test temperature of 23±2° C. in accordance with the national standard GB/T529-2008.
4. Mooney viscosity test: The test is carried out in accordance with the national standard GB/T1232.1-2000, with a Mooney viscosity meter at a test temperature of 125° C. by preheating for 1 minute, and the test is continued for 4 minutes.
5. Hot air accelerated aging test: The test is carried out at 150° C. for 72 h in accordance with the national standard GB/T3512-2001, in a heat aging test chamber.
6. Test of optimum vulcanization time Tc90: The test is carried out at 170° C. in a rotorless vulcanizer in accordance with the national standard GB/T16584-1996.

The vulcanization conditions in the following Examples 1 to 12 and Comparative Examples 1 and 2 include temperature: 170° C.; pressure: 16 MPa; and time Tc90+1 min.

Example 1

Branched polyethylene No. PER-7 was used.
The processing steps were as follows.
(1) Rubber mixing: The temperature of the internal mixer was set to 100° C., and the rotor speed was set to 50 rpm. 90 parts of an EPDM and 10 parts of branched polyethylene were added, prepressed and mixed for 90 seconds. 2 parts of PEG 4000, and 1 part of the anti-aging agent RD were added and mixed for 30 seconds. Then 80 parts of carbon black N550, and 20 parts of paraffin oil SUNPAR2280 were added to the rubber compound, and mixed for 3 min. Finally, 3 parts of the crosslinking agent dicumyl peroxide (DCP) and 1 part of the auxiliary crosslinking agent triallyl isocyanurate (TAIC) were added, mixed for 2 min, and then discharged. The rubber mix was plasticated on an open mill with a roll temperature of 60° C. to obtain a sheet having a thickness of about 2.5 mm, which was placed for 20 hours.
(2) After vulcanization, various tests were carried out after being placed for 16 hrs.

Example 2

Branched polyethylene No. PER-6 was used.
The processing steps were as follows.
(1) Rubber mixing: The temperature of the internal mixer was set to 90° C., and the rotor speed was set to 50 rpm. 85 parts of an EPDM and 15 parts of branched polyethylene were added, prepressed and mixed for 90 seconds. 2 parts of PEG 4000, and 1 part of the anti-aging agent RD were added and mixed for 30 seconds. Then 80 parts of carbon black N550, and 30 parts of paraffin oil SUNPAR2280 were added to the rubber compound, and mixed for 3 min. Finally, 3 parts of the crosslinking agent dicumyl peroxide (DCP) and 1 part of the auxiliary crosslinking agent triallyl isocyanurate (TAIC) were added, mixed for 2 min, and then discharged. The rubber mix was plasticated on an open mill with a roll temperature of 60° C. to obtain a sheet having a thickness of about 2.5 mm, which was placed for 20 hours.
(2) After vulcanization, various tests were carried out after being placed for 16 hrs.

Example 3

Branched polyethylene No. PER-4 was used.
The processing steps were as follows.
(1) Rubber mixing: The temperature of the internal mixer was set to 70° C., and the rotor speed was set to 50 rpm. 70 parts of an EPDM and 30 parts of branched polyethylene were added, prepressed and mixed for 90 seconds. 2 parts of PEG 4000, and 1 part of the anti-aging agent RD were added and mixed for 30 seconds. Then 80 parts of carbon black N550, and 30 parts of paraffin oil SUNPAR2280 were added to the rubber compound, and mixed for 3 min. Finally, 3 parts of the crosslinking agent dicumyl peroxide (DCP) and 1 part of the auxiliary crosslinking agent triallyl isocyanurate (TAIC) were added, mixed for 2 min, and then discharged. The rubber mix was plasticated on an open mill with a roll temperature of 60° C. to obtain a sheet having a thickness of about 2.5 mm, which was placed for 20 hours.
(2) After vulcanization, various tests were carried out after being placed for 16 hrs.

Example 4

Branched polyethylene No. PER-5 was used.
The processing steps were as follows.
(1) Rubber mixing: The temperature of the internal mixer was set to 90° C., and the rotor speed was set to 50 rpm. 50 parts of an EPDM and 50 parts of branched polyethylene were added, prepressed and mixed for 90 seconds. 2 parts of PEG 4000, and 1 part of the anti-aging agent RD were added and mixed for 30 seconds. Then 80 parts of carbon black N550, and 30 parts of paraffin oil SUNPAR2280 were added to the rubber compound, and mixed for 3 min. Finally, 3 parts of the crosslinking agent dicumyl peroxide (DCP) and 1 part of the auxiliary crosslinking agent triallyl isocyanurate (TAIC) were added, mixed for 2 min, and then discharged. The rubber mix was plasticated on an open mill with a roll temperature of 60° C. to obtain a sheet having a thickness of about 2.5 mm, which was placed for 20 hours.
(2) After vulcanization, various tests were carried out after being placed for 16 hrs.

Example 5

Branched polyethylene No. PER-5 was used.
The processing steps were as follows.
(1) Rubber mixing: The temperature of the internal mixer was set to 90° C., and the rotor speed was set to 50 rpm. 20 parts of an EPM, 30 parts of an EPDM and 50 parts of branched polyethylene were added, prepressed and mixed for 90 seconds. 2 parts of PEG 4000, and 1 part of the anti-aging agent RD were added and mixed for 30 seconds. Then 100 parts of carbon black N550, and 30 parts of paraffin oil SUNPAR2280 were added to the rubber compound, and mixed for 3 min. Finally, 3 parts of the crosslinking agent dicumyl peroxide (DCP) and 1 part of the auxiliary crosslinking agent triallyl isocyanurate (TAIC) were added, mixed for 2 min, and then discharged. The rubber mix was plasticated on an open mill with a roll temperature of 60° C. to obtain a sheet having a thickness of about 2.5 mm which was placed for 20 hours.

(2) After vulcanization, various tests were carried out after being placed for 16 hrs.

Example 6

Branched polyethylene No. PER-5 was used.
The processing steps were as follows.
(1) Rubber mixing: The temperature of the internal mixer was set to 90° C., and the rotor speed was set to 50 rpm. 30 parts of an EPDM and 70 parts of branched polyethylene were added, prepressed and mixed for 90 seconds. 2 parts of PEG 4000, and 2 part of the anti-aging agent RD were added and mixed for 30 seconds. Then 170 parts of carbon black N550, and 100 parts of paraffin oil SUNPAR2280 were added to the rubber compound, and mixed for 3 min. Finally, 8 parts of the crosslinking agent dicumyl peroxide (DCP) and 3 part of the auxiliary crosslinking agent triallyl isocyanurate (TAIC) were added, mixed for 2 min, and then discharged. The rubber mix was plasticated on an open mill with a roll temperature of 60° C. to obtain a sheet having a thickness of about 2.5 mm, which was placed for 20 hours.

(2) After vulcanization, various tests were carried out after being placed for 16 hrs.

Comparative Example 1

The processing steps were as follows.
(1) Rubber mixing: The temperature of the internal mixer was set to 90° C., and the rotor speed was set to 50 rpm. 100 parts of an EPDM was added, prepressed and mixed for 90 seconds. 2 parts of PEG 4000, and 1 part of the anti-aging agent RD were added and mixed for 30 seconds. Then 80 parts of carbon black N550, and 20 parts of paraffin oil SUNPAR2280 were added to the rubber compound, and mixed for 3 min. Finally, 3 parts of the crosslinking agent dicumyl peroxide (DCP) and 1 part of the auxiliary crosslinking agent triallyl isocyanurate (TAIC) were added, mixed for 2 min, and then discharged. The rubber mix was plasticated on an open mill with a roll temperature of 60° C. to obtain a sheet having a thickness of about 2.5 mm, which was placed for 20 hours.

(2) After vulcanization, various tests were carried out after being placed for 16 hrs.

| Test Item | Example 1 | Example 2 | Example 3 | Example 4 | Example 5 | Example 6 | Example 7 | Comparative Example 1 |
|---|---|---|---|---|---|---|---|---|
| Hardness | 72 | 71 | 71 | 72 | 72 | 71 | 70 | 68 |
| Tensile strength/MPa | 14.6 | 15.2 | 15.6 | 16.3 | 15.7 | 16.5 | 18.6 | 14.1 |
| Elongation at break/% | 369 | 361 | 392 | 408 | 453 | 288 | 365 | 356 |
| Tear strength/(N/mm) | 35.1 | 37.9 | 37.8 | 41.7 | 39.6 | 43.7 | 51.2 | 34.3 |
| After aging (at 150° C. for 72 h) | | | | | | | | |
| Hardness | 73 | 72 | 73 | 73 | 74 | 78 | 72 | 69 |
| Retention rate of tensile strength/% | 95 | 94 | 96 | 96 | 95 | 98 | 97 | 95 |
| Retention rate of elongation at break/% | 92 | 92 | 90 | 91 | 94 | 90 | 92 | 91 |

Example 7

Branched polyethylene No. PER-5 was used.
The processing steps were as follows.
(1) Rubber mixing: The temperature of the internal mixer was set to 90° C., and the rotor speed was set to 50 rpm. 100 parts of branched polyethylene was added, prepressed and mixed for 90 seconds. 2 parts of PEG 4000, and 1 part of the anti-aging agent RD were added and mixed for 30 seconds. Then 80 parts of carbon black N550, and 20 parts of paraffin oil SUNPAR2280 were added to the rubber compound, and mixed for 3 min. Finally, 3 parts of the crosslinking agent dicumyl peroxide (DCP) and 1 part of the auxiliary crosslinking agent triallyl isocyanurate (TAIC) were added, mixed for 2 min, and then discharged. The rubber mix was plasticated on an open mill with a roll temperature of 60° C. to obtain a sheet having a thickness of about 2.5 mm, which was placed for 20 hours.

(2) After vulcanization, various tests were carried out after being placed for 16 hrs.

Example 8

Branched polyethylene Nos. PER-3 and PER-5 were used.

The processing steps were as follows.
(1) Rubber mixing: The temperature of the internal mixer was set to 90° C., and the rotor speed was set to 50 rpm. 30 parts of PER-3 and 70 parts of PER-5 were added, prepressed and mixed for 90 seconds. 5 parts of zinc oxide, 1 part of stearic acid, 2 parts of PEG4000, and 1 part of the anti-aging agent RD were added and mixed for 30 seconds. Then 100 parts of carbon black N550, 100 parts of calcium carbonate and 80 parts of paraffin oil SUNPAR2280 were added to the rubber compound, and mixed for 3 min. Finally, 4 parts of the crosslinking agent dicumyl peroxide (DCP) and 2 part of the auxiliary crosslinking agent triallyl isocyanurate (TAIC) were added, mixed for 2 min, and then discharged. The rubber mix was plasticated on an open mill with a roll temperature of 60° C. to obtain a sheet having a thickness of about 2.5 mm, which was placed for 20 hours.

(2) After vulcanization, various tests were carried out after being placed for 16 hrs.

Example 9

Branched polyethylene No. PER-4 was used.
The processing steps were as follows.
(1) Rubber mixing: The temperature of the internal mixer was set to 60° C., and the rotor speed was set to 50 rpm. 30 parts of an EPDM and 70 parts of branched polyethylene were added, prepressed and mixed for 90 seconds. 5 parts of zinc oxide, 1 part of stearic acid, 2 parts of PEG 4000, and 1 part of the anti-aging agent RD were added and mixed for 30 seconds. Then 30 parts of carbon black N550, 50 parts of carbon black N774 and 15 parts of paraffin oil SUNPAR2280 were added to the rubber compound, and mixed for 3 min. Finally, 3 parts of the crosslinking agent dicumyl peroxide (DCP) and 1 part of the auxiliary crosslinking agent triallyl isocyanurate (TAIC) were added, mixed for 2 min, and then discharged. The rubber mix was plasticated on an open mill with a roll temperature of 60° C. to obtain a sheet having a thickness of about 2.5 mm, which was placed for 20 hours.
(2) After vulcanization, various tests were carried out after being placed for 16 hrs.

Example 10

Branched polyethylene No. PER-5 was used.
The processing steps were as follows.
(1) Rubber mixing: The temperature of the internal mixer was set to 90° C., and the rotor speed was set to 50 rpm. 70 parts of an EPDM and 30 parts of branched polyethylene were added, prepressed and mixed for 90 seconds. 3 parts of zinc oxide, 2 parts of PEG 4000, and 1 part of the anti-aging agent RD were added and mixed for 30 seconds. Then 50 parts of carbon black N550, and 10 parts of paraffin oil SUNPAR2280 were added to the rubber compound, and mixed for 3 min. Finally, 1 part of the crosslinking agent dicumyl peroxide (DCP), 0.3 part of the auxiliary crosslinking agent triallyl isocyanurate (TAIC), 0.5 part of the crosslinking agent sulfur, 1 part of N-cyclohexyl-2-benzothiazole sulfenamide (CZ), and 0.8 part of tetramethyl thiuram disulfide (TMTD) were added, mixed for 2 min, and then discharged. The rubber mix was plasticated on an open mill with a roll temperature of 60° C. to obtain a sheet having a thickness of about 2.5 mm, which was placed for 20 hours.
(2) After vulcanization, various tests were carried out after being placed for 16 hrs.

Example 11

Branched polyethylene Nos. PER-2 and PER-5 were used.
The processing steps were as follows.
(1) Rubber mixing: The temperature of the internal mixer was set to 90° C., and the rotor speed was set to 50 rpm. 20 parts of PER-2 and 80 parts of PER-5 were added, prepressed and mixed for 90 seconds. 10 parts of zinc oxide, 1 part of stearic acid, 2 parts of PEG4000, and 1 part of the anti-aging agent RD were added and mixed for 30 seconds. Then 40 parts of carbon black N550, 60 parts of carbon black 774, and 20 parts of paraffin oil SUNPAR2280 were added to the rubber compound, and mixed for 3 min. Finally, 3 parts of the crosslinking agent dicumyl peroxide (DCP) and 8 parts of the auxiliary crosslinking agent 1,2-polybutadiene were added, mixed for 2 min, and then discharged. The rubber mix was plasticated on an open mill with a roll temperature of 60° C. to obtain a sheet having a thickness of about 2.5 mm, which was placed for 20 hours.
(2) After vulcanization, various tests were carried out after being placed for 16 hrs.

Example 12

Branched polyethylene Nos. PER-1 and PER-5 were used.
The processing steps were as follows.
(1) Rubber mixing: The temperature of the internal mixer was set to 90° C., and the rotor speed was set to 50 rpm. 10 parts of PER-1 and 90 parts of PER-5 were added, prepressed and mixed for 90 seconds. 5 parts of magnesia, 1 part of stearic acid, 2 parts of PEG4000, and 1 part of the anti-aging agent RD were added and mixed for 30 seconds. Then 100 parts of carbon black N550, and 30 parts of paraffin oil SUNPAR2280 were added to the rubber compound, and mixed for 3 min. Finally, 5 parts of the crosslinking agent dicumyl peroxide (DCP) and 2 part of the auxiliary crosslinking agent triallyl isocyanurate (TAIC) were added, mixed for 2 min, and then discharged. The rubber mix was plasticated on an open mill with a roll temperature of 60° C. to obtain a sheet having a thickness of about 2.5 mm, which was placed for 20 hours.
(2) After vulcanization, various tests were carried out after being placed for 16 hrs.

Comparative Example 2

The processing steps were as follows.
(1) Rubber mixing: The temperature of the internal mixer was set to 60° C., and the rotor speed was set to 50 rpm. 100 parts of an EPDM was added, prepressed and mixed for 90 seconds. 5 parts of zinc oxide, 1 part of stearic acid, 2 parts of PEG 4000, and 1 part of the anti-aging agent RD were added and mixed for 30 seconds. Then 30 parts of carbon black N550, 50 parts of carbon black N774 and 30 parts of paraffin oil SUNPAR2280 were added to the rubber compound, and mixed for 3 min. Finally, 3 parts of the crosslinking agent dicumyl peroxide (DCP) and 1 part of the auxiliary crosslinking agent triallyl isocyanurate (TAIC) were added, mixed for 2 min, and then discharged. The rubber mix was plasticated on an open mill with a roll temperature of 60° C. to obtain a sheet having a thickness of about 2.5 mm, which was placed for 20 hours.
(2) After vulcanization, various tests were carried out after being placed for 16 hrs.

| Test Item | Example 8 | Example 9 | Example 10 | Example 11 | Example 12 | Comparative Example 2 |
|---|---|---|---|---|---|---|
| Hardness | 71 | 65 | 60 | 72 | 73 | 62 |
| Tensile strength/MPa | 16.2 | 16.8 | 16.4 | 17.2 | 17.9 | 12.4 |
| Elongation at break/% | 392 | 346 | 603 | 425 | 419 | 485 |
| Tear strength/(N/mm) | 44.6 | 33.4 | 39.2 | 48.3 | 48.9 | 31.6 |
| After aging (at 150° C. for 72 h) | | | | | | |
| Hardness | 73 | 67 | 59 | 74 | 75 | 63 |
| Retention rate of tensile strength/% | 94 | 95 | 96 | 94 | 96 | 96 |
| Retention rate of elongation at break/% | 92 | 90 | 92 | 94 | 93 | 93 |

Example 13

An automobile radiator rubber hose has an inner rubber layer formed of a rubber composition that is the rubber composition produced in Example 7. The production process was as follows.
(1) Rubber mixing: The temperature of the internal mixer was set to 90° C., and the rotor speed was set to 50 rpm. 100 parts of branched polyethylene was added, prepressed and mixed for 90 seconds. 2 parts of PEG 4000, and 1 part of the anti-aging agent RD were added and mixed for 30 seconds. Then 80 parts of carbon black N550, and 20 parts of paraffin oil SUNPAR2280 were added to the rubber compound, and mixed for 3 min. Finally, 3 parts of the crosslinking agent dicumyl peroxide (DCP) and 1 part of the auxiliary crosslinking agent triallyl isocyanurate (TAIC) were added, mixed for 2 min, and then discharged. The rubber mix was plasticated on an open mill, and then the sheet was unloaded and placed.
(2) Extrusion molding: An inner rubber layer was extruded by using a cold feed extruder, then a fiber reinforcing layer was knitted on the inner rubber layer, and then an outer rubber layer was extruded to obtain a hose blank which was cut for vulcanization later.
(3) Vulcanization: A mandrel was inserted into the hose blank, and then high-temperature steam vulcanization was performed for 25 min at a temperature of 165° C. under a steam pressure of 1 MPa. After cooling, the hose was removed from the mandrel, trimmed, inspected, and stored to obtain an automobile radiator rubber hose.

The rubber composition used in the inner rubber layer is solely the rubber composition produced in Example 7.

Example 14

An automobile radiator rubber hose has an outer rubber layer formed of a rubber composition that is the rubber composition produced in Example 7. The production process was the same as that in Example 13.

Example 15

An automobile radiator rubber hose has an inner rubber layer and an outer rubber layer formed of a rubber composition that is the rubber composition produced in Example 7. The production process was the same as that in Example 13.

Example 16

An air-conditioning rubber hose has an inner rubber layer formed of a rubber composition that is the rubber composition produced in Example 9. The production process was as follows.
(1) Rubber mixing: The temperature of the internal mixer was set to 60° C., and the rotor speed was set to 50 rpm. 30 parts of an EPDM and 70 parts of branched polyethylene were added, prepressed and mixed for 90 seconds. 5 parts of zinc oxide, 1 part of stearic acid, 2 parts of PEG 4000, and 1 part of the anti-aging agent RD were added and mixed for 30 seconds. Then 30 parts of carbon black N550, 50 parts of carbon black N774 and 15 parts of paraffin oil SUNPAR2280 were added to the rubber compound, and mixed for 3 min. Finally, 3 parts of the crosslinking agent dicumyl peroxide (DCP), 1 part of the auxiliary crosslinking agent N,N'-m-phenylene bismaleimide (HVA-2), and 0.3 part of the auxiliary crosslinking agent sulfur were added, mixed for 2 min, and then discharged. The rubber mix was plasticated on an open mill, and then the sheet was unloaded and placed.
(2) Extrusion molding: A mandrel was prepared, a nylon alloy lining was extruded on the mandrel, then an inner rubber layer was extruded, a fiber reinforcing layer was knitted, and then an outer rubber layer was extruded.
(3) Vulcanization: A tape wrapping vulcanization process was used, during which the temperature was 165° C., the steam pressure was 1 MPa, and the vulcanization time was 25 min. Then, the tape was unwrapped, and the hose was removed from the mandrel, and cut, to obtain an air-conditioning rubber hose.

Example 17

An air-conditioning rubber hose has an outer rubber layer formed of a rubber composition that is the rubber composition produced in Example 9. The production process was the same as that in Example 16.

Example 18

An air-conditioning rubber hose has an inner rubber layer and an outer rubber layer formed of a rubber composition that is the rubber composition produced in Example 9.

The production process was the same as that in Example 16.

Example 19

A rubber hose assembly was produced through a process below.
(1) Rubber mixing: The rubber composition in an inner rubber layer had the following components, in parts by weight, 100 parts of branched polyethylene PER-4, 1 part of the anti-aging agent RD, 80 parts of carbon black N550, 20 parts of calcium carbonate, 40 parts of paraffin oil SUNPAR2280, 3 parts of dicumyl peroxide (DCP), and 1 part of N,N'-m-phenylene bismaleimide. The rubber composition in an outer rubber layer had the following components, in parts by weight, 100 parts of branched polyethylene PER-4, 1 part of the anti-aging agent RD, 80 parts of carbon black N550, 20 parts of calcium carbonate, 50 parts of paraffin oil SUNPAR2280, 3 parts of dicumyl peroxide (DCP), and 1 part of N,N'-m-phenylene bismaleimide.

The raw materials of the inner rubber layer and the outer rubber layer were processed respectively into an inner-layer rubber mix and an outer-layer rubber mix by an open mill or an internal mixer, and the impurities were removed by filtration after being inspected qualified.

(2) Molding of hose blank: The inner rubber layer was extruded by using a cold feed extruder, an Aramid fiber layer was knitted on the outer surface of the inner rubber layer, and finally the outer-layer rubber mix was extruded by an outer rubber layer extruder in such a way that the outer-layer rubber mix is coated on the outer surface of the Aramid fiber layer, to form a hose blank.

(3) Vulcanization: The hose blank was sleeved on a mandrel of a hose mold, placed in a steam vulcanizer, vulcanized for 25 min by pressurizing to 0.9 MPa with steam and heating to 175° C., to obtain a vulcanized rubber hose.

(4) Fitting clamping hoops: The vulcanized rubber hose was cleaned and cut, and a pre-open clamping hoop was bonded at both ends of each hose, to obtain a rubber hose assembly.

Example 20

An air-conditioning rubber hose has an inner rubber layer and an outer rubber layer formed of the same rubber composition. The production process was as follows.

(1) Rubber mixing: The temperature of the internal mixer was set to 60° C., and the rotor speed was set to 50 rpm. 100 parts of branched polyethylene PER-8 was added, prepressed and mixed for 90 seconds. 5 parts of zinc oxide, 1 part of stearic acid, 2 parts of PEG 4000, and 1 part of the anti-aging agent MB were added and mixed for 30 seconds. Then 30 parts of carbon black N550, 50 parts of carbon black N774 and 15 parts of paraffin oil SUNPAR2280 were added to the rubber compound, and mixed for 3 min. Finally, 3 parts of the crosslinking agent dicumyl peroxide (DCP), 1 part of the auxiliary crosslinking agent N,N'-m-phenylene bismaleimide (HVA-2), and 0.3 part of the auxiliary crosslinking agent sulfur were added, mixed for 2 min, and then discharged. The rubber mix was plasticated on an open mill, and then the sheet was unloaded and placed.

(2) Extrusion molding: A mandrel was prepared, a nylon alloy lining was extruded on the mandrel, then an inner rubber layer was extruded, a fiber reinforcing layer was knitted, and then an outer rubber layer was extruded.

(3) Vulcanization: A tape wrapping vulcanization process was used, during which the temperature was 165° C., the steam pressure was 1 MPa, and the vulcanization time was 25 min. Then, the tape was unwrapped, and the hose was removed from the mandrel, and cut, to obtain an air-conditioning rubber hose.

The rubber mix of the rubber composition of this example was molded into a test sample which was tested to have the following performances:

hardness: 68; tensile strength: 26.3 MPa; elongation at break: 468%; and tear strength: 60 N/mm.

Example 21

An automobile radiator rubber hose has an inner rubber layer and an outer rubber layer formed of the same rubber composition. The production process was as follows.

(1) Rubber mixing: The temperature of the internal mixer was set to 90° C., and the rotor speed was set to 50 rpm. 100 parts of branched polyethylene PER-9 was added, prepressed and mixed for 90 seconds. 2 parts of PEG 4000, 1 part of the anti-aging agent MB, 1 part of the anti-aging agent RD, and 3 parts of solid coumarone were added and mixed for 30 seconds. Then 70 parts of carbon black N550, and 15 parts of paraffin oil SUNPAR2280 were added to the rubber compound, and mixed for 3 min. Finally, 3 parts of the crosslinking agent dicumyl peroxide (DCP) and 1 part of the auxiliary crosslinking agent triallyl isocyanurate (TAIC) were added, mixed for 2 min, and then discharged. The rubber mix was plasticated on an open mill, and then the sheet was unloaded and placed.

(2) Extrusion molding: An inner rubber layer was extruded by using a cold feed extruder, then a fiber reinforcing layer was knitted on the inner rubber layer, and then an outer rubber layer was extruded to obtain a hose blank which was cut for vulcanization later.

(3) Vulcanization: A mandrel was inserted into the hose blank, and then high-temperature steam vulcanization was performed for 25 min at a temperature of 165° C. under a steam pressure of 1 MPa. After cooling, the hose was removed from the mandrel, trimmed, inspected, and stored to obtain an automobile radiator rubber hose.

The rubber mix of the rubber composition of this example was molded into a test sample which was tested to have the following performances:

hardness: 66; tensile strength: 27.8 MPa; elongation at break: 532%; and tear strength: 62 N/mm.

Example 22

An automobile radiator rubber hose has an inner rubber layer and an outer rubber layer formed of the same rubber composition. The production process was as follows.

(1) Rubber mixing: The temperature of the internal mixer was set to 90° C., and the rotor speed was set to 50 rpm. 100 parts of branched polyethylene PER-10 was added, prepressed and mixed for 90 seconds. 2 parts of PEG 4000, 1 part of the anti-aging agent MB, 2 parts of solid coumarone, and 3 parts of modified alkyl phenolic resin TKM-M were added and mixed for 30 seconds. Then 80 parts of carbon black N550, and 20 parts of paraffin oil SUNPAR2280 were added to the rubber compound, and mixed for 3 min. Finally, 3 parts of the crosslinking agent dicumyl peroxide (DCP) and 1 part of the auxiliary crosslinking agent triallyl isocyanurate (TAIC) were added, mixed for 2 min, and then discharged. The rubber mix was plasticated on an open mill, and then the sheet was unloaded and placed.

(2) Extrusion molding: An inner rubber layer was extruded by using a cold feed extruder, then a fiber reinforcing layer was knitted on the inner rubber layer, and then an outer rubber layer was extruded to obtain a hose blank which was cut for vulcanization later.

(3) Vulcanization: A mandrel was inserted into the hose blank, and then high-temperature steam vulcanization was performed for 25 min at a temperature of 165° C. under a steam pressure of 1 MPa. After cooling, the hose was removed from the mandrel, trimmed, inspected, and stored to obtain an automobile radiator rubber hose.

The rubber mix of the rubber composition of this example was molded into a test sample which was tested to have the following performances:

hardness: 65; tensile strength: 25.4 MPa; elongation at break: 482%; and tear strength: 58 N/mm.

As can be seen through comparison of the performances in the above examples and comparative examples, the rubber composition containing the branched polyethylene has higher tensile strength and tear resistance under the conditions that other ingredients in the formulation are the same or similar. The rubber hose produced with this rubber composition as a raw material has a significantly reduced probability of tearing of the rubber hose during production and use. Meanwhile, the resistance to hot air aging at 150° C. is maintained at the same level as that of the rubber composition comprising an ethylene-propylene rubber alone, thus meeting the requirements for high temperature resistance of the automobile radiator rubber hose and air-conditioning rubber hose at present.

The superiority of the branched polyethylene in cross-linking ability is illustrated through the comparison of the crosslinking performance tests of Examples 23 and 24 and Comparative Example 3.

In Example 23, the rubber matrix comprises 100 parts of PER-9. In Example 24, the rubber matrix comprises 50 parts of PER-9 and 50 parts of an EPDM (having an ML(1+4) at 125° C. of 80, an ethylene content of 55%, and an ENB content of 5.5%). In Comparative Example 3, the rubber matrix comprises 100 parts of EPM used in Example 24. The rest of the formation is the same.

The processing steps of the three rubber compositions were as follows.

(1) Mixing: The temperature of the internal mixer was set to 80° C., and the rotor speed was set to 50 rpm. A rubber matrix was added, pre-pressed and mixed for 90 seconds. 5 parts of zinc oxide, and 1 part of stearic acid were added, and mixed for 1 min.

(2) Then 80 parts of carbon black N550, 10 parts of calcium carbonate, and 60 parts of paraffin oil were added to the rubber compound, and mixed for 3 min.

(3) Finally, 3 parts of the crosslinking agent BIPB and 1 part of the auxiliary crosslinking agent TAIC were added, and mixed for 2 min, and then discharged.

(4) The rubber mix was plasticated on an open mill with a roll temperature of 60° C. to obtain a sheet having a thickness of about 2.5 mm, which was placed for 20 hours and then tested for the vulcanization performance.

The test condition includes 30 min at 175° C. The test results are shown below.

|  | Example 23 | Example 24 | Comparative Example 3 |
|---|---|---|---|
| ML, dN · m | 2.02 | 1.20 | 0.6 |
| MH, dN · m | 12.74 | 11.94 | 11.23 |
| MH − ML, dN · m | 10.72 | 10.74 | 10.63 |
| Tc90, min | 6.8 | 7.5 | 8.2 |

The rubber composition of Example 23 has the shortest Tc90, and a higher MH-ML value than that of Comparative Example 3, which is indicating that the cross-linking ability of branched polyethylene used in Example 23 is slightly better than that of conventional EPDMs. The rubber composition of Example 24 has a Tc90 between that of Example 23 and Comparative Example 3, and has a larger MH-ML value than that of Example 23 and Comparative Example 3, which is indicating that the combination is expected to increase the overall crosslinking density.

Although preferred embodiments of the present invention have been described herein, these embodiments are provided merely by way of examples. It is to be understood that variations of the embodiments of the present invention described herein can also be used in the practice of the present invention. It will be appreciated by those skilled in the art that various modifications, changes and substitutions can be made without departing from the scope of the present invention. It is to be understood that the scope of the present invention is defined by the appended claims, and the methods, structures, and equivalents thereof within the scope of the claims are also contemplated in the scope of the claims.

What is claimed is:

1. A rubber composition comprising a rubber matrix and certain essential components, wherein the rubber matrix comprises, based on 100 parts by weight of the rubber matrix,
   a branched polyethylene with a content represented as A, in which 0<A≤100 parts, and
   an EPM and/or an EPDM, with a total content represented as B, in which 0≤B<100 parts;
   wherein, with respect to 100 parts by weight of the total amount of the rubber matrix, the certain essential components comprise 1.5 to 8 parts of a crosslinking agent, 50 to 200 parts of a reinforcing filler, and 10 to 100 parts of a plasticizer, and
   wherein the branched polyethylene comprises an ethylene homopolymer having a branching degree of from about 60 to 95 branches/1000 carbon atoms, a weight average molecular weight of from 66,000 to 518,000, and a Mooney viscosity ML (1+4) at 125° C. of from 6 to 102.

2. The rubber composition according to claim 1, wherein, with respect to 100 parts by weight of the total amount of the rubber matrix, the content of the branched polyethylene is represented as A, in which 10≤A≤100 parts, and the content of both the EPM and the EPDM is represented as B, in which 0≤B≤90 parts.

3. The rubber composition according to claim 1, wherein the crosslinking agent comprises at least one of a sulfur crosslinking agent and a peroxide crosslinking agent, wherein the peroxide crosslinking agent comprises at least one of di-tert-butyl peroxide, dicumyl peroxide, tert-butyl cumyl peroxide, 1,1-di-tert-butyl peroxide-3,3,5-trimethyl-cyclohexane, 2,5-dimethyl-2,5-di(tert-butylperoxy)hexane, 2,5-dimethyl-2,5-di(tert-butylperoxy)hexyne-3, bis(tert-butylperoxyisopropyl)benzene, 2,5-dimethyl-2,5-bis(benzoylperoxy)hexane, tert-butyl peroxybenzoate, and tert-butylperoxy-2-ethylhexyl carbonate.

4. The rubber composition according to claim 1, wherein the reinforcing filler comprises at least one of carbon black, calcium carbonate, calcined clay, magnesium silicate, aluminum silicate, magnesium carbonate, talc, and diatomite.

5. The rubber composition according to claim 1, wherein the plasticizer comprises at least one of stearic acid, pine tar, motor oil, naphthenic oil, paraffin oil, coumarone, paraffin, liquid polyisobutene, and dioctyl sebacate.

6. The rubber composition according to claim 1, wherein the rubber composition further comprises auxiliary components, which comprise, with respect to 100 parts by weight of the total amount of the rubber matrix, 0.2 to 8 parts of an auxiliary crosslinking agent, 2 to 15 parts of a metal oxide, 1 to 3 parts of a stabilizer, 1 to 5 parts of polyethylene glycol, and 0 to 3 parts of a vulcanization accelerator, wherein, the auxiliary crosslinking agent comprises at least one of triallyl cyanurate, triallyl isocyanurate, ethylene glycol dimethacrylate, ethyl dimethacrylate, triethyleneglycol dimethacrylate, triallyl trimellitate, trimethylolpropane trimethacrylate, ethylene dimethacrylate, N,N'-m-phenylene bismaleimide, N,N'-bis(furfurylidene)acetone, 1,2-polybutadiene, a metal salt of an unsaturated carboxylic acid, and sulfur;

the metal oxide comprises at least one of zinc oxide, magnesia, and calcium oxide;

the stabilizer comprises at least one of 2,2,4-trimethyl-1,2-dihydroquinoline polymer (RD), 6-ethoxy-2,2,4-trimethyl-1,2-dihydroquinoline (AW), and 2-mercaptobenzimidazole (MB);

the polyethylene glycol comprises at least one of those polyethylene glycol having a molecular weight of 2000, 3400, and 4000; and the vulcanization accelerator comprises at least one of 2-mercaptobenzothiazole, dibenzothiazyl disulfide, tetramethyl thiuram monosulfide, tetramethyl thiuram disulfide, tetraethyl thiuram disulfide, zinc di-n-butyl dithiocarbamate, N-cyclohexyl-2-benzothiazole sulfenamide, N,N-dicyclohexyl-2-benzothiazole sulfenamide, bismaleimide, and ethylene thiourea.

7. The rubber composition according to claim 1, wherein the ethylene homopolymer has a branching degree of from 60 to 94 branches/1000 carbon atoms.

8. The rubber composition according to claim 1, wherein the ethylene homopolymer has a branching degree of from 60 to 87 branches/1000 carbon atoms.

9. The rubber composition according to claim 1, wherein the ethylene homopolymer has a branching degree of from 60 to 82 branches/1000 carbon atoms.

10. The rubber composition according to claim 1, wherein the ethylene homopolymer has a branching degree of from 60 to 70 branches/1000 carbon atoms.

11. The rubber composition according to claim 1, wherein the ethylene homopolymer has a branching degree of 60 branches/1000 carbon atoms, 70 branches/1000 carbon atoms, 82 branches/1000 carbon atoms, 87 branches/1000 carbon atoms, 94 branches/1000 carbon atoms, or 95 branches/1000 carbon atoms.

12. The rubber composition according to claim 1, wherein the ethylene homopolymer has a branching degree of about 60 branches/1000 carbon atoms, about 70 branches/1000 carbon atoms, about 82 branches/1000 carbon atoms, about 87 branches/1000 carbon atoms, 94 branches/1000 carbon atoms, or 95 branches/1000 carbon atoms.

13. A rubber hose, wherein the rubber compound used for the rubber hose comprises the rubber composition according to claim 1.

14. The rubber hose according to claim 13, wherein the rubber hose is an automobile radiator rubber hose having an inner rubber layer and an outer rubber layer, and wherein the rubber compound used for at least one of the inner rubber layer and the outer rubber layer comprises the rubber composition.

15. The rubber hose according to claim 13, wherein the rubber hose is an air-conditioning rubber hose having an inner rubber layer and an outer rubber layer, and wherein the rubber compound used for at least one of the inner rubber layer and the outer rubber layer comprises the rubber composition.

16. A rubber hose assembly, having an inner rubber layer and an outer rubber layer, wherein the rubber compound used for at least one of the inner rubber layer and the outer rubber layer comprises the rubber composition according to claim 1.

* * * * *